Feb. 25, 1941.  W. H. KITTO  2,232,788
BEARING
Filed April 24, 1939

INVENTOR
William H. Kitto
BY
Harry S. Demarst
ATTORNEY

Patented Feb. 25, 1941

2,232,788

UNITED STATES PATENT OFFICE 2,232,788

BEARING

William H. Kitto, Canton, Ohio, assignor to The Hoover Company, North Canton, Ohio, a corporation of Ohio Application April 24, 1939, Serial No. 269,621

9 Claims. (Cl. 308—134.1)

The present invention relates to bearings in general and particularly to bearings for lubricating vertically mounted shafts.

It is an object of the invention to provide a new and improved bearing construction. Another object is to provide a unitary bearing construction in which a porous sleeve bearing is mounted in oil-retaining means, and means at opposite ends of the porous bearing for returning escaped oil by centrifugal force to the oil-retaining means. A further object is to provide a bearing construction including a sleeve bearing and oil-retaining means housed as a unit in an assembly adapted for mounting on a suitable support. Further objects and advantages of the invention will be apparent from the following specification and claims and drawing, wherein:

Figure 1:
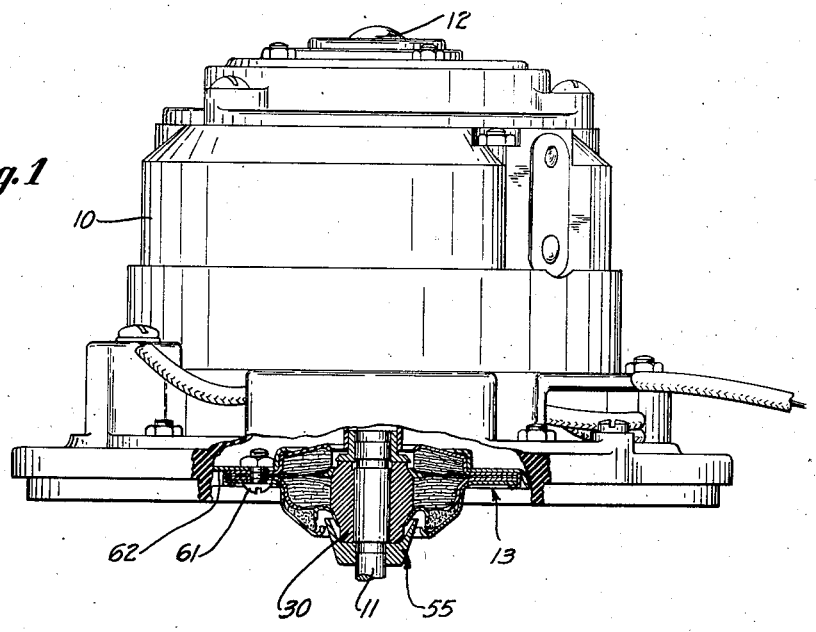
Figure 1 is a side elevation of an electrical motor with certain parts broken away and showing a bearing constructed in accordance with the present invention embodied therein.
Figure 2:
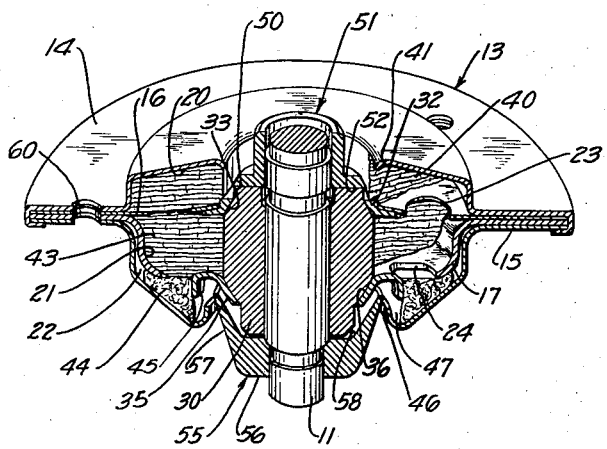
Figure 2 is an enlarged section through the bearing unit similar to the showing in Figure 1; and, Figure 3 is a view of an element in the bearing comprising a metal plate which supports the lower end of the sleeve bearing and the lower oil-retaining means.
Figure 3:
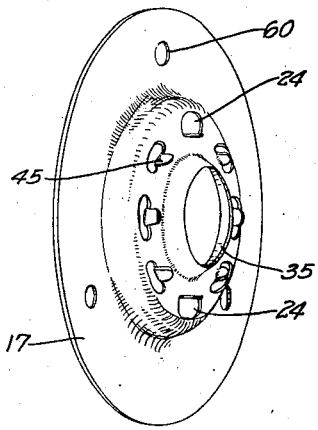

The embodiment of the invention herein disclosed is illustrated in a motor 10 provided with an armature shaft 11 rotatably mounted in upper and lower bearings indicated generally by the reference characters 12 and 13 respectively. The present invention relates specifically to the lower bearing 13 and the elements which cooperate therewith.

The bearing 13 comprises a housing formed of upper and lower flanged cups 14 and 15, respectively. The flange of the upper cup 14 is peened over the peripheral edge of the flange of the lower cup 15 to secure the two cups together. A metal plate 16 is positioned in the housing and has its outer margin clamped between the flanges of the cups 14 and 15. A metal plate 17 is positioned in the bearing housing below the plate 16 and has its margin clamped between the flanges of the cups 14 and 15. Plates 16 and 17 divide the housing into three chambers 20, 21 and 22. Annularly arranged spaced openings 23 are provided in the plate 16 to connect the chambers 20 and 21, and the chambers 21 and 22 are connected by apertures 24 spaced circumferentially in the plate 17.

An oil porous sleeve bearing 30 is supported by the plates 16 and 17, the plate 16 having a central opening which is provided with a removable metal collar 32 that engages the tapered wall 33 of the bearing. The plate 17 is provided with a central opening the boundary 35 of which projects downwardly to form a collar that engages the tapered wall 36 of the sleeve bearing.

Arranged in the upper chamber 20 is a ring of lubricant absorbing and oil-retaining material 40. The ring 40 is held in position and spaced from the sleeve bearing and shaft 11 by the depending annular collar 41 on the flanged cup 14. Arranged in the chamber 21 and contacting the sleeve bearing 30 is another ring of oil-absorbing and oil-retaining material 43. Another oil ring 44 is arranged in the lower chamber 22 and is held in position by lugs 45 depending from the metal plate 17. The lower oil ring 44 is spaced from an upwardly projecting annular flange 46 on the lower cup 15 to form therewith an annular oil reservoir 47. The oil rings 40, 43 and 44 are connected by being in contact at the openings 23 and 24 in the plates 16 and 17 respectively, the three oil rings being compressed to such an extent that they are in contact at their adjacent surfaces.

The sleeve bearing 30 projects above the plate 16 and its upper end terminates in a thrust bearing surface 50 disposed opposite the chamber 20. A thrust collar 51 is fixed to the shaft 11 and has a horizontal thrust flange surface 52 butting against the thrust surface 50 on the sleeve bearing 30. The thrust collar also functions to throw any oil that collects between the thrust bearing surfaces 50 and 52 outwardly by centrifugal force across the space between the upper end of the sleeve bearing 30 and the chamber 20 into contact with the surrounding inner annular wall of the oil ring 40 where it will be absorbed.

A cup-shaped oil thrower 55 has its bottom wall 56 rigidly supported on the shaft 11. The annular side wall 57 of the oil thrower 55 tapers outwardly and is spaced from and overlaps the lower end of the sleeve bearing 30 to form an oil collecting chamber 58, and the tapered wall 57 overlaps the lower end of the collar 35 on the plate 17 and the upper end of the annular flange 46 on the lower cup 15. The oil thrower 55 collects in the reservoir 58 any oil that escapes between the sleeve bearing 30 and the depending collar 35 on the supporting member 17, and any oil that escapes between the adjacent bearing surfaces on the shaft 11 and sleeve bearing 30. Any oil that collects in the reservoir 58 is thrown outwardly by centrifugal force across the space between the thrower 55 and the projecting annular flange 46 into contact with the surrounding annular wall of the oil ring 44 where it will be absorbed. Any oil not absorbed by the ring 44 collects in the annular oil reservoir 47.

Openings 60 are provided at circumferentially spaced points around the bearing housing to permit the unit to be secured by removable screws 61 to the bottom plate 62 of the motor 10 or to any suitable support to which it is desired to connect the bearings.

In operation, the shaft 11 rotates in the porous sleeve bearing 30 carrying with it the combined thrust collar and oil-thrower 51 and the oil thrower 55. The sleeve bearing is lubricated with suitable lubricating oil which is positioned between the sleeve bearing 30 and the shaft 11, and between the thrust bearing surfaces 50 and 52 on the sleeve bearing 30 and thrust collar 51 respectively with a residue and surplus positioned within the oil rings 40, 43 and 44. During rotation of the shaft 11 a certain amount of oil will escape from between the contacting surfaces of the sleeve bearing 30 and the shaft 11. The oil that escapes from the contacting thrust bearing surfaces 50 and 52 will be removed by the centrifugal force developed by the rotating thrust bearing 51 and will be thrown outwardly across the space between the thrust collar and the chamber 20 into contact with the surrounding annular inner wall of the oil ring 40 where it will be absorbed. Since the thrust collar 51 is sealed to the shaft 11 the oil cannot pass above the oil bearing surface 52. The oil that escapes from the contacting shaft and sleeve bearing surfaces will pass downwardly into the oil reservoir 58 in the oil thrower 55, since the shaft is vertical. As the oil thrower 55 is sealed to the shaft 11 the oil cannot pass downwardly but will be removed by centrifugal force to the periphery of the oil thrower 55 and be thrown outwardly into contact with the surrounding annular inner wall of the oil ring 44 where it will be absorbed. The oil will then be returned, due to the capillary action of the oil rings 43 and 40, through the apertures 24 and 23 in the plates 17 and 16 respectively, as needed to supply the porous sleeve bearing 30 with lubricant. The surplus oil accumulates in the annular reservoir 47 in the lower cup 15 and is in contact with the lower oil ring 44.

It is to be understood that the protection herein applied for is not confined to the particular combinations of features or elements set out in the following claims. Protection is herein applied for, for any one or more of the features or elements referred to in the following claims, or described in the foregoing specifications or shown in the accompanying drawing, either independently or in combination.

I claim:

1. A bearing construction comprising a housing having a shaft receiving opening, a pair of members in said housing and supported thereby, a porous sleeve bearing supported by said members in alignment with said opening, a lubricating ring of oil absorbing material supported between one of said members and said housing and encircling said bearing in spaced relation, an oil thrower on a shaft in said bearing for throwing oil centrifugally therefrom upon said lubricating means, a second lubricating ring supported between said members and encircling said bearing and in contact therewith, a third lubricating ring of oil absorbing material supported between another of said members and said housing and encircling said bearing in spaced relation, an oil thrower on said shaft for throwing oil centrifugally therefrom upon said third lubricating ring.

2. A bearing construction comprising a housing having a shaft receiving opening, a pair of members in said housing and supported thereby, a sleeve bearing supported by said members in alignment with said opening, oil absorbent material supported between each of said members and said housing, means depending from one of said members to position oil-absorbing material in spaced relation from a shaft seated in said sleeve, and an oil thrower between said shaft and oil absorbent material and operable to throw oil centrifugally therefrom upon said oil absorbent material.

3. A bearing construction comprising a housing having a shaft receiving opening, a pair of members in said housing and supported thereby, a porous sleeve bearing seated between and supported by said members in alignment with said opening, oil absorbent material supported between said members and extending circumferentially around said porous sleeve bearing to feed oil directly thereto, and oil absorbent material supported between each of said members and said housing and interconnected with the other absorbent material and being extended beyond one end of said bearing to receive centrifugally thrown oil from a rotating shaft seated in said housing.

4. A bearing construction comprising a housing having a shaft receiving opening, a pair of members in said housing and supported thereby, a porous sleeve bearing seated between and supported by said members in alignment with said opening, oil absorbent material supported between said members and extending circumferentially around said porous sleeve bearing to feed oil directly thereto, oil absorbent material supported between each of said members and said housing and interconnected with the other absorbent material, and an oil thrower on said shaft to throw oil from said shaft to a part of said second mentioned oil absorbing material.

5. A bearing construction comprising a housing having a shaft receiving opening, a pair of members in said housing and supported thereby, a sleeve bearing seated between and supported by said members in alignment with said opening, oil retaining means supported between each of said members and said housing and extending circumferentially around said sleeve bearing and beyond one end thereof for receiving centrifugally thrown oil from a rotating shaft seated in said bearing.

6. A bearing construction comprising a housing having a shaft receiving opening, a pair of members in said housing and supported thereby, a porous sleeve bearing seated between and supported by said members in alignment with said opening, and oil-retaining and feeding means carried between said members and between said housing and said members and extending circumferentially around said sleeve bearing to feed oil directly thereto.

7. In combination in a bearing construction and a rotatable shaft mounted therein, a bearing housing, a sleeve bearing in said housing rotatably seating said shaft, oil absorbing means in said housing extending circumferentially around and spaced radially from said sleeve bearing and extended beyond one end thereof, a thrust collar butting one end of said bearing and rotatable relative thereto, said oil absorbing means encircling said butting surfaces in spaced relation, said thrust collar operating to throw oil centrifugally from said butting surfaces into contact with said spaced encircling oil absorbing means upon rotation of said shaft.

8. In combination in a vertical shaft and a bearing construction therefor, a vertical shaft, a bearing housing, a pair of members in said housing for supporting a porous sleeve bearing in said housing, said bearing rotatably seating said shaft, oil absorbing means in said housing encircling said bearing in contact therewith intermediate its ends and spaced therefrom at its opposite ends, and oil throwers at the opposite ends of said sleeve bearing for centrifugally throwing off oil therefrom into contact with the adjacent spaced encircling oil absorbing means.

9. A bearing construction comprising a housing having a shaft receiving opening, a pair of members in said housing and supported thereby, a porous sleeve bearing supported in said housing by said pair of members and rotatably receiving a shaft, lubricating material supported between said members and encircling said porous bearing and contacting the latter, a first lubricant absorbing ring supported between one of said members and said housing, a second lubricant absorbing ring supported between the other of said members and said housing, oil throwers on said shaft at opposite ends of said porous bearing, said lubricant absorbing rings being spaced from said oil throwers for receiving oil from the latter, said pair of members having apertures therein for interconnecting said oil absorbing rings with said lubricating material.

WILLIAM H. KITTO.